(12) United States Patent
Henry et al.

(10) Patent No.: US 8,409,691 B1
(45) Date of Patent: Apr. 2, 2013

(54) THREE-DIMENSIONAL (3D) REINFORCEMENT CONTROL IN COMPOSITE MATERIALS

(75) Inventors: Christopher P. Henry, Thousand Oaks, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 468 days.

(21) Appl. No.: 12/212,469

(22) Filed: Sep. 17, 2008

Related U.S. Application Data

(60) Provisional application No. 60/973,004, filed on Sep. 17, 2007.

(51) Int. Cl.
*B32B 1/00* (2006.01)

(52) U.S. Cl. ...................................................... 428/174

(58) Field of Classification Search ................... 428/174
See application file for complete search history.

(56) References Cited

U.S. PATENT DOCUMENTS

| | | | | |
|---|---|---|---|---|
| 3,397,496 | A | * | 8/1968 | Sohns .............................. 52/286 |
| 5,368,930 | A | | 11/1994 | Samples |
| 5,407,612 | A | | 4/1995 | Gould et al. |
| 5,906,873 | A | * | 5/1999 | Kim ................................ 428/57 |
| 7,901,524 | B1 | | 3/2011 | McKnight et al. |
| 8,071,171 | B1 | | 12/2011 | Doty et al. |
| 2006/0163431 | A1 | * | 7/2006 | Dittrich ......................... 244/126 |
| 2006/0192465 | A1 | | 8/2006 | Kornbluh et al. |

OTHER PUBLICATIONS

Semiatin, S.L., ASM Handbook, vol. 14B—Metalworking: Sheet Forming, Aug. 31, 2006, ASM International, p. 668.*
McKnight, et al., U.S. Appl. No. 12/354,662, filed Jan. 15, 2009, titled "*Microstructured Reconfigurable Composite Material*", Application and Office Actions.
Henry, et al., U.S. Appl. No. 12/587,469, filed Oct. 6, 2009, titled "*Elastomeric Matrix Composites*", Application and Office Actions.

* cited by examiner

*Primary Examiner* — Maria Veronica Ewald
*Assistant Examiner* — Laura Auer
(74) *Attorney, Agent, or Firm* — Christie, Parker & Hale, LLP

(57) ABSTRACT

A variable stiffness segmented composite material including reinforcements embedded in a variable stiffness matrix and having a structure for precisely controlling the three-dimensional (3D) distribution and connectivity of the reinforcements in the variable stiffness matrix. The composite material includes a variable stiffness matrix and a plurality of rigidly interconnected reinforcements embedded within the variable stiffness matrix, the interconnected reinforcements being for mitigating a deformation of the composite material along a first direction by blocking a rigid body motion of the reinforcements with respect to one another in the first direction while allowing a deformation in a second direction differing from the first direction. That is, in one embodiment, the interconnected reinforcements are configured to move with respect to one another to allow for an in-plane deformation of the composite material while mitigating an out-of-plane deformation of the composite material.

21 Claims, 18 Drawing Sheets

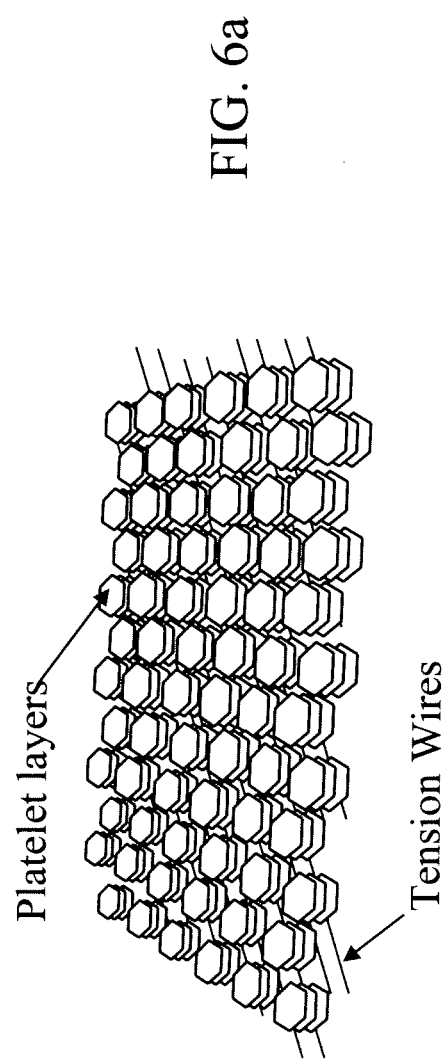
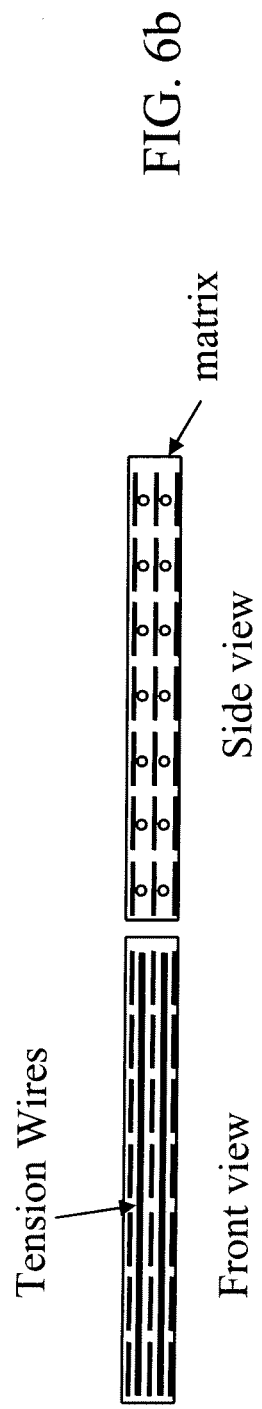
FIG. 6a
FIG. 6b
Platelet layers
Tension Wires
matrix
Side view
Tension Wires
Front view ized reinforcements to precisely align
THREE-DIMENSIONAL (3D) REINFORCEMENT CONTROL IN COMPOSITE MATERIALS

CROSS-REFERENCE TO RELATED APPLICATION(S)

This application claims priority to and the benefit of U.S. Provisional Application No. 60/973,004, filed on Sep. 17, 2007, entitled "Three-Dimensional (3D) Reinforcement Control In Composite Materials." The entire contents of the above-referenced application are incorporated herein by reference.

STATEMENT REGARDING FEDERALLY SPONSORED RESEARCH OR DEVELOPMENT

This invention was made with Government support under Contract No. FA8650-06-5059 awarded by AFRL. The Government has certain rights in the invention.

FIELD OF INVENTION

The present invention relates to systems and methods for precisely controlling the three-dimensional (3D) distribution and connectivity of structural reinforcement elements in a polymer-matrix composite.

BACKGROUND OF THE INVENTION

The field of smart materials and intelligent structures has been gradually developing over the past few decades, increasingly enabled by technological advances in the areas of sensors, engineering materials, and actuators. The basis of many actuator and sensor technologies has increasingly been found in emerging "variable stiffness materials." Variable stiffness materials, as a category, are materials that change their shape in response to an external control stimulus, typically a field, such as a thermal, magnetic, or electric field, but also radiation (light) or a changing chemical environment. Materials in this broad category include several classes, often delineated by the stimulus and material type: shape memory alloys (SMAs), shape memory polymers (SMPs), piezoelectric ceramics, magnetostrictives, and electroactive polymers. Within each of these classes, there are many materials; e.g., within electroactive polymers alone there are a wide variety of low- and high-voltage-activated materials with widely-varying properties, such as ionic-polymer metal composites, conductive polymers, gels, and others.

Additionally, deployable and/or deformable structures have been obtained using variable stiffness materials incorporated with linear elastic materials. Moreover, variable stiffness segmented composite materials have been developed.

In variable stiffness segmented composite materials, there are two components. These two components are the variable stiffness matrix component and the reinforcement component. In operation, a variable stiffness segmented composite material can be used in two operation modes. In the first operation mode, the variable stiffness matrix component effectively connects the reinforcement component elements to provide large stiffness. In the second operation mode, the variable stiffness matrix component is dramatically softened (or otherwise changed in state) to effectively disconnect the reinforcement component elements. In this second operation mode, large deformation can be achieved.

However, deformable structures that undergo operation or performance enhancing shape changes and have zero-power-hold functionality have limited utility in thin, planar form factors (such as morphing skins) if undesirable deformations are not prevented, accommodated or recovered. An example of such deformable structures with the above functionality is a covering made of variable stiffness materials incorporating shape memory polymers as shown in FIGS. 1a, 1b, and 2. For variable stiffness segmented composite materials (hereafter also referred to as "variable stiffness materials," "VSMs," or "variable stiffness composites"), a typical composite microstructure is a laminate composed of alternating layers of a stiff, structural material such as (but not limited to) steel or aluminum, and a shape memory polymer or other polymer such as epoxy, vinyl ester or polyester variants. The shape memory polymer can be of the thermoplastic or thermoset type. The thermoset shape memory polymer precursor is a liquid mixture of resin and curing agent, and can be applied via wet lay-up or infusion methods. Other polymers and elastomers or may be used as a matrix material.

During operation or performance enhancing shape changes, the variable stiffness material covering becomes soft, and compressive stresses or out-of-plane operational loads may induce undesired out-of-plane deformations as shown in FIGS. 3a and 3b. As such, a continuing need exists to mitigate these undesirable deformations.

SUMMARY OF INVENTION

Aspects of embodiments of the present invention are directed toward systems and methods for precisely controlling the three-dimensional (3D) distribution and connectivity of structural reinforcement elements in a polymer-matrix composite. In one embodiment, the controlling of the 3D distribution and connectivity of structural reinforcement elements in the polymer-matrix composite is to achieve nonuniform, spatial, and directional stiffness tailoring in thin, planar form factor in reversibly deformable, segmented composites.

Other embodiments of the present invention provide systems and methods to improve the spatial variability and tailorability of in-plane and out-of-plane stiffness while still maintaining highly controlled geometric layouts for segmented composite materials. Because these composites are designed to deform, the reinforcement elements (or reinforcements) in these composites move with respect to one another; these reinforcements can make use of general rigid body motion (such as translation and rotation).

Other embodiments of the present invention also provide systems and methods that utilize stamping or etching to create 3D relief in the reinforcements and attaching these reinforcements through the thickness in thin form factor structures. This changes the effective mechanical load transfer and moment of inertia through the thickness of the composite.

Other embodiments of the present invention also provide systems and methods that utilize registration dimples or troughs for thermoplastic-based composites to precisely align and restrict relative motion of these reinforcements, which mechanically "attaches" these reinforcements via load transmission vertically through the thickness.

Other embodiments of the present invention also provide systems and methods that utilize brazing, welding, interference fit, or mechanical interlocks (such as tongue and groove) to precisely align and restrict relative motion of reinforcement preforms in thermoset based composites.

Other embodiments of the present invention also provide systems and methods that vary gap distance, reinforcement material, size, orientation and geometry over the surface area to control in-plane stiffness locally.

Methods and system of modifying stretching or bending stiffness in thin, planar form factors according to embodiments of the present invention include: placing tension cables (or stripes or wires) embedded in a deformable matrix; maintaining, in a segmented composite, spatial separation of the reinforcements with respect to each other in plane; and/or modifying areal reinforcement layout, material, size and orientation and geometry to change the local axial stiffness. As such, embodiments of the present invention can locally tailor the ratio of local bending-to-axial stiffness in a spatially controllable fashion.

In one embodiment, the modifying of areal reinforcement layout, material, size and orientation and geometry to change the local axial stiffness includes the steps of generating a terrain map of component deformation; providing a mapping of material properties (strain and stiffness) for particular architecture (or geometry) choices of reinforcement and matrix to optimize properties spatially; altering one or more composite reinforcement design variables of the component to provide changes in the stiffness and strain properties of the composites so that the desired combination of stiffness and maximum strain are achieved; generating a mask pattern to define the reinforcement layout spatially across the composite material component; utilizing the area defined by the mask to create the reinforcement from a metallic or other reinforcement material; and/or assembling and creating the layers and composite materials of the component.

More specifically, an embodiment of the present invention provides a variable stiffness segmented composite material including a variable stiffness matrix and a plurality of rigidly interconnected reinforcements embedded within the variable stiffness matrix. The interconnected reinforcements are for mitigating a deformation of the composite material along a first direction by blocking a rigid body motion of the reinforcements with respect to one another in the first direction while allowing a deformation in a second direction differing from the first direction.

In one embodiment, the interconnected reinforcements are configured to move with respect to one another to allow for an in-plane deformation of the composite material while mitigating an out-of-plane deformation of the composite material.

In one embodiment, the first direction is perpendicular to the second direction.

In one embodiment, the reinforcements are rigidly interconnected along the first direction.

In one embodiment, the reinforcements are composed of a constant stiffness material.

In another embodiment, the reinforcements are composed of more than one constant stiffness material.

In one embodiment, the reinforcements are composed of metal.

In one embodiment, the variable stiffness matrix is composed of a thermoplastic-based material. The reinforcements may include registration dimples or troughs to precisely align and restrict relative motion of the reinforcements embedded in the variable stiffness matrix. The registration dimples or troughs mechanically may interconnect the reinforcements via load transmission along the first direction.

In one embodiment, the variable stiffness matrix is composed of a thermoset based material. The reinforcements may be brazed, welded, interference fitted, or mechanical interlocked to one another to precisely align and restrict relative motion of the reinforcements embedded in the variable stiffness matrix. The reinforcements may include tongues and grooves to mechanical interlock the reinforcements to one another and to precisely align and restrict relative motion of the reinforcements embedded in the variable stiffness matrix.

In one embodiment, each of the reinforcements has a three-dimensional cut, stamped or etched relief, and the reinforcements are attached along the first direction to change an effective mechanical load transfer and moment of inertial through a thickness of the composite material.

Another embodiment of the present invention provides a variable stiffness segmented composite material including a variable stiffness matrix, a plurality of reinforcements embedded within the variable stiffness matrix, and a plurality of connectors. The reinforcements are rigidly interconnected by the connectors to mitigate a deformation of the composite material along a first direction while allowing deformation of the variable stiffness matrix along a second direction differing from the first direction.

In one embodiment, the reinforcements are interconnected by the connectors to move with respect to one another to allow for an in-plane deformation of the composite material while mitigating an out-of-plane deformation of the composite material.

In one embodiment, the first direction is perpendicular to the second direction.

In one embodiment, the connectors rigidly interconnect the reinforcements along the first direction.

In one embodiment, the variable stiffness matrix is composed of a thermoplastic-based material. The connectors may include registration dimples or troughs to precisely align and restrict relative motion of the reinforcements embedded in the variable stiffness matrix. The registration dimples or troughs may mechanically interconnect the reinforcements via load transmission along the first direction.

In one embodiment, the variable stiffness matrix is composed of a thermoset based material. The connectors may include braze joints, weld joints, interference fittings, or mechanical interlocks to interconnect the reinforcements to one another and to precisely align and restrict relative motion of the reinforcements embedded in the variable stiffness matrix. The connectors may include tongues and grooves to mechanical interlock the reinforcements to one another and to precisely align and restrict relative motion of the reinforcements embedded in the variable stiffness matrix.

Another embodiment of the present invention provides a variable stiffness segmented composite material including a variable stiffness, a shearing frame, a reinforcement element, and a cable. The variable stiffness matrix has at least one edge. The shearing frame is along the at least one edge of the planar variable stiffness matrix. The reinforcement element is embedded within the variable stiffness matrix. In addition, the cable is also embedded within the variable stiffness matrix. Here, the cable runs along a plane of the variable stiffness matrix, and is attached to the shearing frame to mitigate out-of-plane deformation of the composite material by blocking a rigid body motion of the reinforcement element embedded within the variable stiffness matrix while allowing an in-plane deformation of the composite material.

A more complete understanding for controlling the 3D distribution and connectivity of structural reinforcement elements in composite materials will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The accompanying drawings, together with the specification, illustrate exemplary embodiments of the present invention, and, together with the description, serve to explain the principles of the present invention.

FIGS. 6a and 6b illustrate tension wires (or strips or cables) in a deformable matrix to constrain out-of-plane deformation of the composite according to another embodiment of the present invention.

DETAILED DESCRIPTION

Figure 1A:
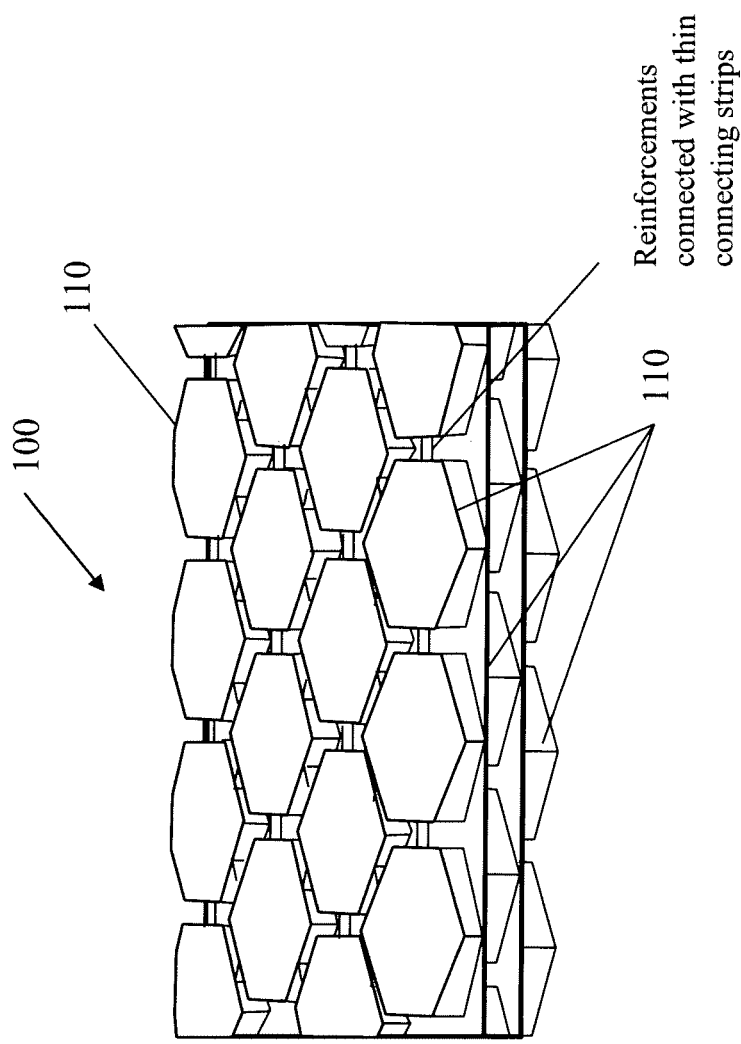
FIGS. 1a and 1b respectively are a perspective view and a cross-sectional view of a simplified illustration of a variable stiffness material (VSM) (or variable stiffness composite structure).

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Also, in the context of the present application, when an element is referred to as being "on" another element, it can be directly on the another element or be indirectly on the another element with one or more intervening elements interposed therebetween. Like reference numerals designate like elements throughout the specification.

Embodiments of the present invention relate to systems and methods for precisely controlling the three-dimensional (3D) distribution and connectivity of structural reinforcement elements in a polymer-matrix composite. In one embodiment, the controlling of the 3D distribution and connectivity of structural reinforcement elements in the polymer-matrix composite is to achieve nonuniform, spatial, and directional stiffness tailoring in thin, planar form factor in reversibly deformable, segmented composites.

Figure 1B:
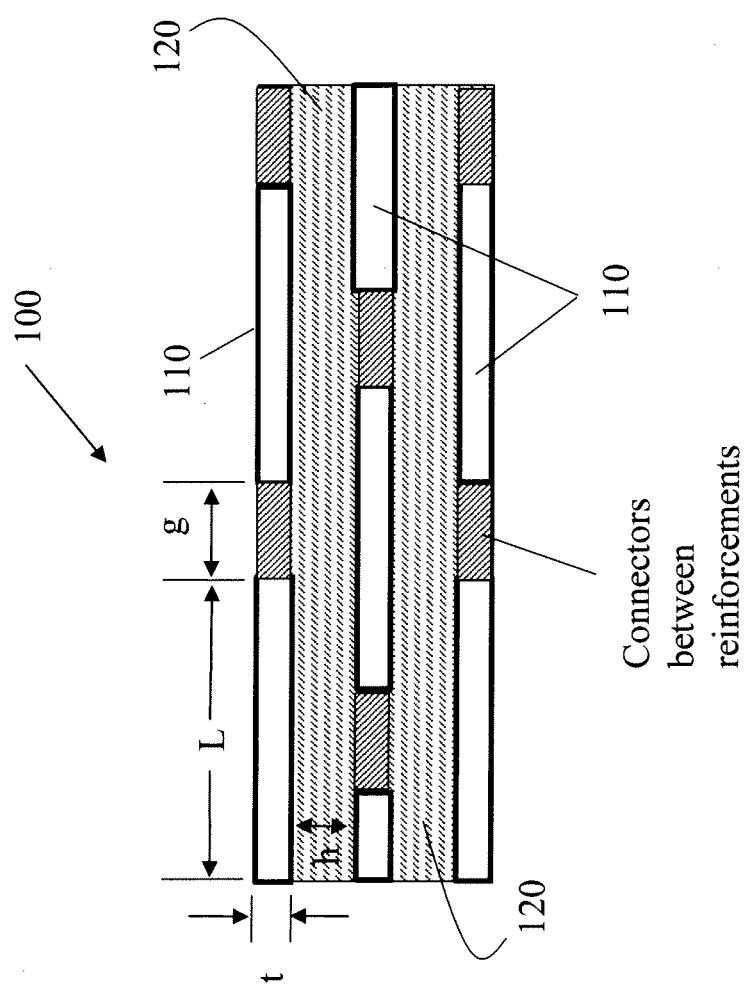

FIGS. 1a and 1b respectively are a perspective view and a cross-sectional view of a simplified illustration of a variable stiffness material (VSM) (or variable stiffness composite structure) 100. As shown in FIGS. 1a and 1b, the VSM 100 includes structural reinforcement elements (constant stiffness components) 110 distributed (or laminated) in a polymer matrix (variable stiffness components) 120. The VSM 100 is a structure whose elastic stiffness in bending and/or axial/compression loading may be adjusted when required by applying, exposing, or otherwise subjecting the structure to appropriate control conditions (i.e. thermal, electrical, magnetic, chemical, electromagnetic, etc.). In one embodiment as shown in FIG. 1b, the structural reinforcement elements (or layers) 110 and the thermosetting polymers (or layers) 120 are arranged in alternating layers.

Figure 2:
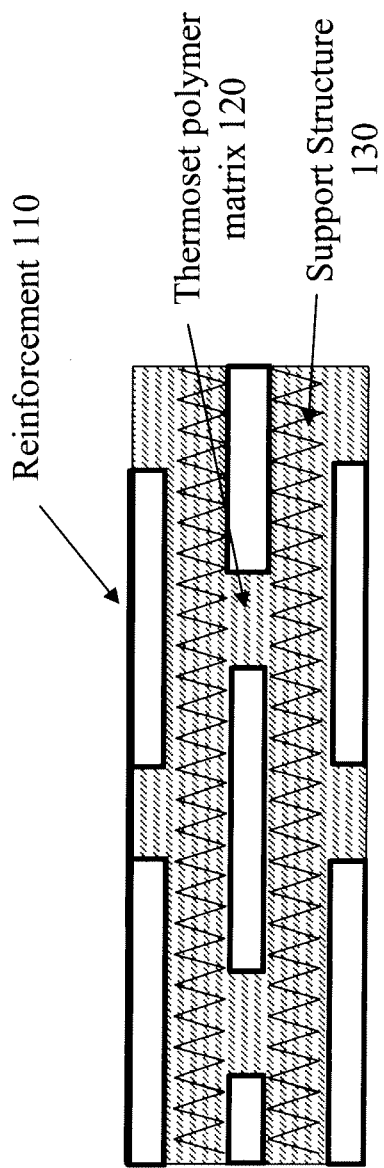
FIG. 2 is a cross-section view of an idealized composite showing a representation of a support structure which maintains control of the spatial distribution of reinforcement elements prior to solidification of polymer matrix.

FIG. 2 is a cross-section view of an idealized composite showing a representation of a support structure which maintains control of the spatial distribution of reinforcement elements prior to solidification of polymer matrix.

Referring to FIG. 2, in one embodiment, a composite-making process uses a liquid thermosetting resin as the basis for the polymer matrix 120. To ensure that the liquid thermosetting resin are cured with the reinforcement elements (or platelets) 110 at substantially the same time to thereby ensure that the polymer matrix 120 are properly bounded to the reinforcement elements (or platelets) 120, the reinforcement elements (or platelets) 110 according to an embodiment of the present invention are created on an intermediate support structure 130 which is capable of adhering to the platelets and maintaining their orientation (e.g., planarity and direction) and spacing, and which can be embedded in the finished composite without compromising its mechanical, thermal or other properties. In one embodiment, the intermediate support structure 130 is composed of a mesh that also provides spacing between laminated layers through the thickness of the composite 100.

In variable stiffness segmented composite materials, there are at minimum two components. These two essential components are the variable stiffness matrix component and the reinforcement component. In operation, a variable stiffness segmented composite material can be used in two operation modes. In the first operation mode, the variable stiffness matrix component effectively connects the reinforcement component elements to provide large stiffness. In the second operation mode, the variable stiffness matrix material component is dramatically softened (or otherwise changed in state) to effectively disconnect the reinforcement component elements. In this second operation mode, large deformation can be achieved.

However, deformable structures that undergo operation or performance enhancing shape changes and have zero-power-hold functionality have limited utility in thin, planar form factors (such as morphing skins) if undesirable deformations are not prevented, accommodated or recovered. An example of such deformable structures with the above functionality is a covering made of variable stiffness materials incorporating shape memory polymers as shown in FIGS. 1a, 1b, and 2. For variable stiffness segmented composite materials (hereafter also referred to as "variable stiffness materials," "VSMs," or "variable stiffness composites"), a typical composite microstructure is a laminate composed of alternating layers of a stiff, structural material such as (but not limited to) steel or aluminum, and a shape memory polymer or other similar polymer such as epoxy, vinyl ester or polyester variants. The shape memory polymer can be of the thermoplastic or thermoset type. The thermoset shape memory polymer precursor is a liquid mixture of resin and curing agent, and can be applied via wet lay-up or infusion methods. Other polymers and elastomers or may be used as a matrix material.

Figure 3A:
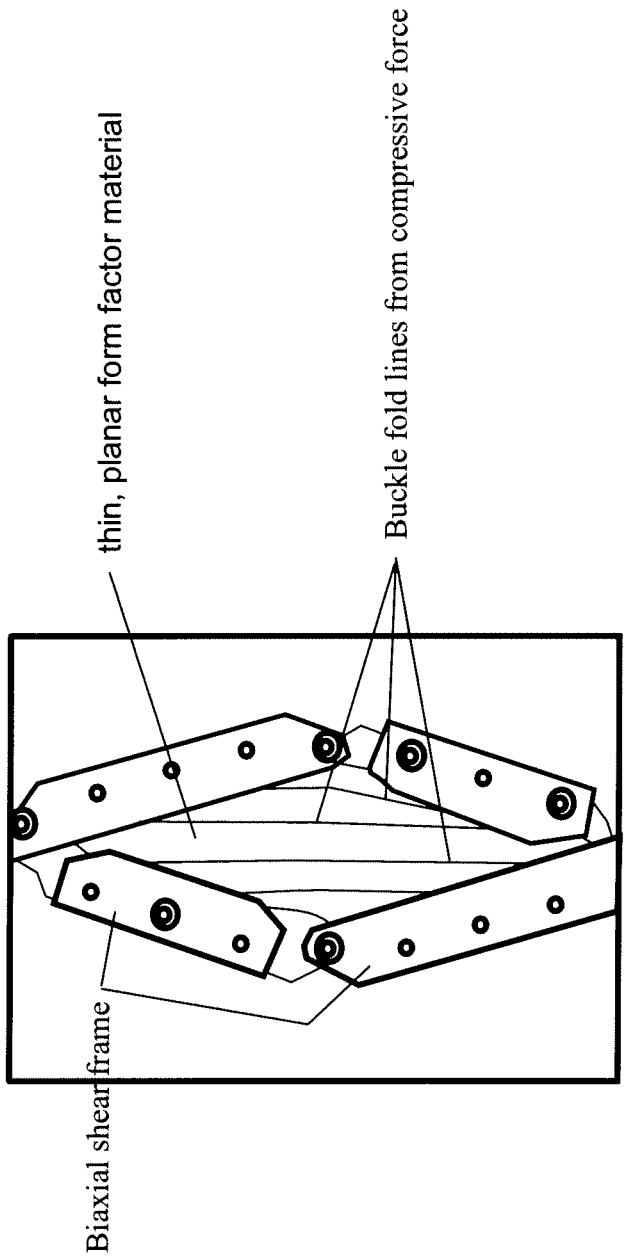
FIGS. 3a and 3b show and/or illustrate compressive loads or operation loads inducing buckling of thin, planar form factor structures.
Figure 3B:
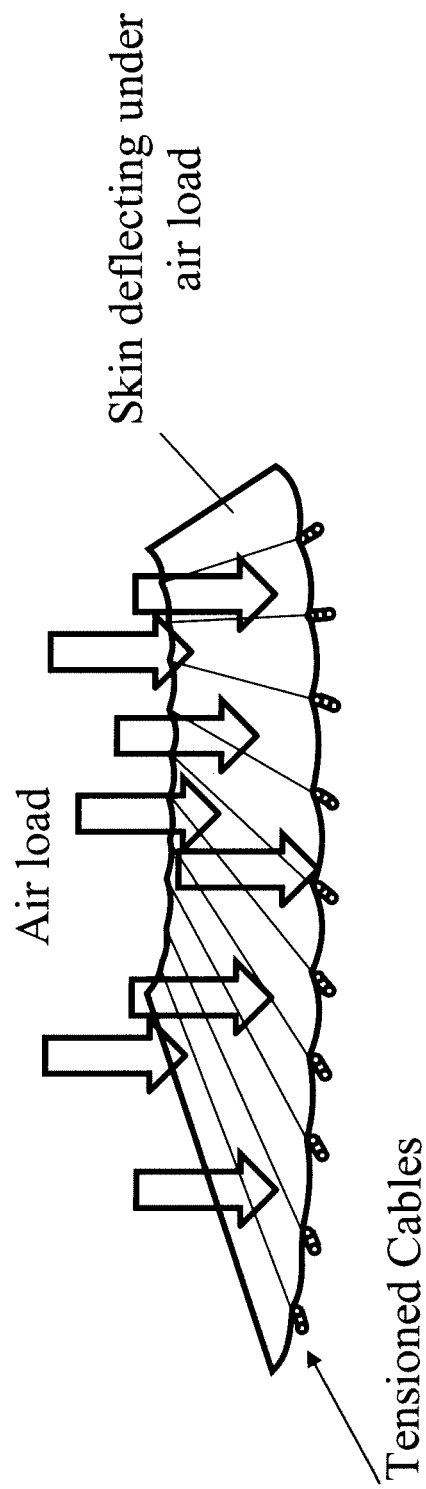

During operation or performance enhancing shape changes, the variable stiffness material covering becomes soft and compressive stresses or out-of-plane operational loads may induce undesired out-of-plane deformations as shown in FIGS. 3a and 3b.

In more detail, FIGS. 3a and 3b show and/or illustrate compressive loads or operations loads inducing buckling of thin, planar form factor structures.

Figure 4A:
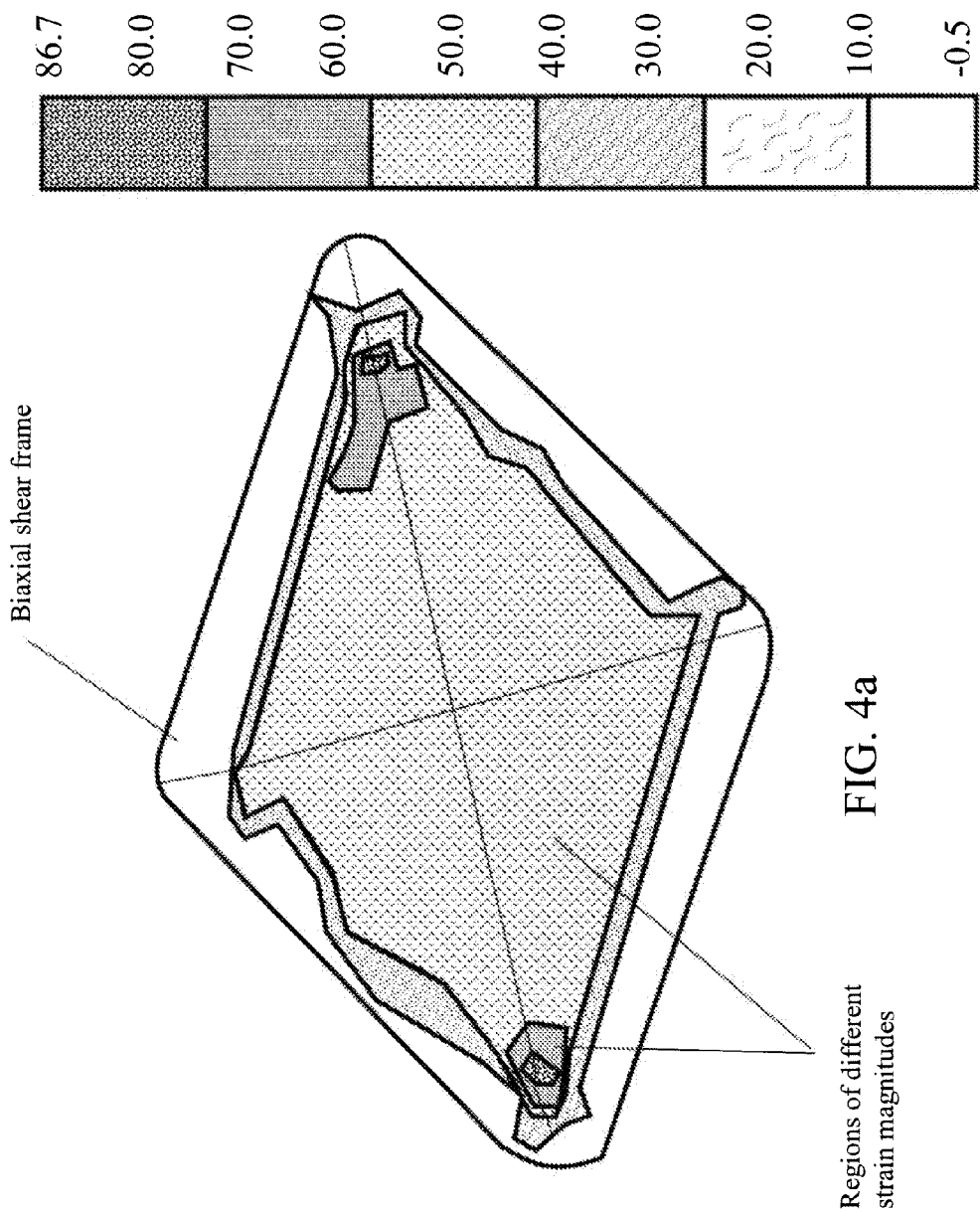
FIG. 4a illustrates three non-uniform in-plane stretching deformations caused by boundary conditions.

Embodiments of the present invention provide a solution to the above problem by utilizing multi-scale engineered composite materials, which incorporate distributed, embedded elements specifically designed to mitigate buckling. Non-uniform in-plane stretching deformation, as illustrated in FIG. 4a caused by boundary conditions and other factors limits performance and contributes to fatigue and localized failure due to the composite's inability to accommodate large local strain changes. That is, the regions of greatest strain (e.g., at the left and right sides of the structure) of FIG. 4a illustrate three non-uniform in-plane stretching deformations caused by boundary conditions. Embodiments of the present invention are capable of solving this problem by prescribing reinforcement aspect ratios and spacing across the surface of the composite component. Using this approach, the strain and stiffness response across the thin, planar composite can be prescribed to provide a desired (or optimal) strain-limited reinforcement layout and architecture across the surface. This approach can also improve cycle life, surface quality and repeatability of deformation in the composite. Here, embodiments of the present invention provide various suitable reinforcement geometries and reinforcement modifications that may help mitigate undesirable deformations by prescribing or constraining local reinforcement strains or global buckling deformations.

In more detail, embodiments of the present invention enhance the variable stiffness segmented composite materials as described above. That is, as described above, there are two components in a variable stiffness segmented composite material, the variable stiffness matrix component and the reinforcement component. Here, the variable stiffness segmented composite material can be used in two operation modes. In the first operation mode, the variable stiffness matrix component effectively connects the reinforcement component elements to provide large stiffness. In the second operation mode, the variable stiffness matrix material component is dramatically softened (or otherwise changed in state) to effectively disconnect the reinforcement component elements. An embodiment of the present invention provides a variable stiffness material approach that is capable of having good properties in each of the two operational modes or states (stiffness and deformation).

An alternative embodiment for these materials uses matrices with constant elastic stiffness rather than variable elastic stiffness. The matrix material may be a non-variable modulus material (i.e., always flexible with a constant modulus) or variable modulus material. Suitable non-limiting exemplary non-variable modulus material includes members of the elastomer family of amorphous polymers used above their glass transition temperature. Examples include Natural Rubber (NR), Synthetic Polyisoprene (IR), Butyl rubber (copolymer of isobutylene and isoprene, IIR), Halogenated butyl rubbers (Chloro-butyl Rubber: CIIR; Bromobutyl Rubber: BIIR), Polybutadiene (BR), Styrene-butadiene Rubber (copolymer of polystyrene and polybutadiene, SBR), Nitrile Rubber (copolymer of polybutadiene and acrylonitrile, NBR), also called Buna N rubbers, Hydrogenated Nitrile Rubbers (HNBR) Therban and Zetpol, Chloroprene Rubber (CR), polychloroprene, Neoprene, Baypren, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM), Tecnoflon PFR, Kalrez, Chemraz, Perlast, Polyether Block Amides (PEBA), Chlorosulfonated Polyethylene (CSM), (Hypalon), Ethylene-vinyl acetate (EVA), Thermoplastic elastomers (TPE), and Thermoplastic Vulmayizates (TPV), for example Santoprene TPV, Thermoplastic Polyurethane (TPU), Thermoplastic Olefins (TPO).

That is, in general, the reinforcement material is patterned to be uniform across the entire surface of a component. This can be done in various suitable ways depending on the design. In one embodiment, hexagonal "tiles" or platelets as shown in FIGS. 1a, 1b, and 2 are utilized as the reinforcement material. One embodiment of the present invention provides an ability to place different patterns across the surface according to the need in that region. This is useful, because there is a trend that as the deformation that a composite can achieve is increased, the stiffness in its stiff state decreases. In general, it is desired to maximize the stiffness for a given deformation need. Therefore, an embodiment of the present invention provides an approach that can increase the strain (and decrease the stiffness) only in those regions that require it and maximize the stiffness elsewhere.

Figure 4B:
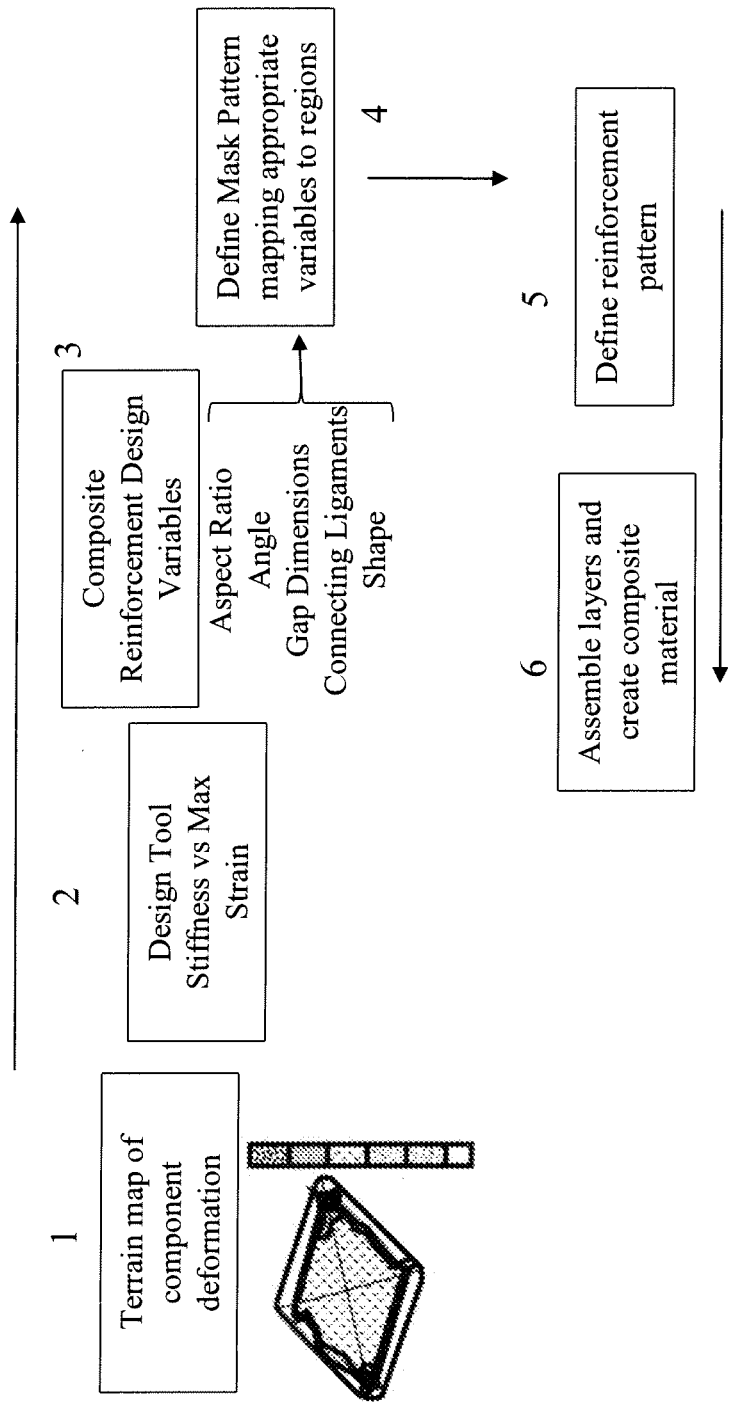
FIG. 4b illustrates a method to achieve optimized (or high-performance) variable stiffness composite properties over a component area according to an embodiment of the present invention.

Referring to FIG. 4b, an embodiment of the present invention provides a method to achieve proper variable stiffness composite properties over a component area. FIG. 4b is a schematic showing a process flow to achieve the proper variable stiffness composite properties. The first step in the creation of the proper composite is the identification of the deformation necessary to achieve the desired motion of the component. Given the spatial mapping of needed deformations as shown in FIG. 4a, a mapping of deformation to stiffness properties, such as that generated via simulations or experimental testing, can be used to identify particular reinforcement microstructures that will provide the optimal combinations of properties for that region. Many variables can be altered to provide changes in the stiffness and strain properties of the composites as shown in FIG. 4b. Other considerations may also provide input to the selection of particular designs including reinforcement material, surface texture requirements, and electrical, magnetic, or thermal properties, etc. Given this information, a reinforcement layout may be generated that contains variations of geometry across the surface. This pattern may then be used to define the reinforcement. Methods such as chemical etching or stamping may be used to physically define the reinforcement pattern. Several reinforcement layers may be combined with a hosting matrix material, such as a shape memory polymer or other phase change material, to create a composite material component.

As an example, referring to FIG. 4b, in step 1, the method according to an embodiment of the present invention starts with generating a terrain map of component deformation. That is, the first step in the creation of the composite according to an embodiment of the present invention is the identification of the deformation necessary to achieve the desired motion of the component. This, for example, can be accomplished using software simulations or measuring full field strain variations on a flexible test structure using a photogrammetry technique.

In step 2, the method provides a mapping of material properties (strain and stiffness) for particular architecture (or geometry) choices of reinforcement and matrix to optimize properties spatially. The mapping of deformation to stiffness properties, such as that generated via simulations or experimental testing, can be used to identify particular reinforcement microstructures that will provide the proper combinations of properties for that region.

In step 3, one or more composite reinforcement design variables of the component are altered to provide changes in the stiffness and strain properties of the composites so that the desired combination of stiffness and maximum strain are achieved. These can be predicted or analyzed using suitable composite micromechanics techniques. Suitable variables of interest to be changed include those listed in FIG. 4b, such as shape, aspect ratio, orientation, etc.

In step 4, a mask pattern is generated that defines the reinforcement layout spatially across the composite material component. This mask is used in the processing steps where the reinforcement is patterned, typically from flat sheets.

In step 5, the area defined by the mask is used to create the reinforcement from a metallic or other reinforcement material. The reinforcement material can be created using chemical etching in which case the mask is a photolithographic mask, or the process such as stamping in which case the mask would be used to define the shape of the stamping tool.

In step 6, the layers and composite materials of the component are assembled and created. As such, the method of FIG. 4b provides the proper composite reinforcement design variables in accordance with the terrain map to, for example, mitigate undesirable deformations by prescribing or constraining local reinforcement strains or global buckling deformations.

Here, the purpose according to an embodiment of the present invention is to remove limitations of design and application operation that use thin, planar deformable segmented composites. This may be accomplished by tailoring local stiffness spatially over the surface, and directionally tailoring stiffness to modify in-plane versus out-of-plane deformation to desirable levels. This includes suppressing out-of-plane deformation in deformable materials caused by out-of-plane operational loads or performance enhancing shape changes that induce compressive buckling stresses. To solve this problem, an embodiment of the present invention increases the geometric moment of inertia contribution to the structural bending stiffness. To solve the non-uniform in-plane deformation requirements, an embodiment of the present invention locally modifies the in-plane stretching stiffness. These stiffness modifications can be achieved by engineering the number and position of laminate layers of the composite or geometry, spacing, tiling and layout of the composite reinforcements for specified in-plane deformation non-uniformities and mitigation of out-of-plane deformation.

Embodiments of the present invention can improve shape and displacement tolerance needed for shape sensitive applications, such as wings, control surfaces, inlets/outlets, drag surfaces interacting with flow fields (air, water and other fluids) and waves (EM, shock, sound, etc.), such as tunable reflectors, antennas, gratings, mirrors. Other embodiments of the present invention can also improve car body panel morphing for performance or styling and interior styling, can improve aircraft flap and panel joints, and/or can improve antenna tailored spatial and temporal stiffness of reflectors.

That is, typical variable stiffness materials that use shape memory polymers and planar reinforcements in thin, planar form factors cannot sustain large normal (i.e. out-of-plane) forces or pressures while changing stiffness, as these loads will cause undesirable out-of-plane deformations that are not easily recovered. Embodiment of the present invention offer modifications and augments the variable stiffness material architecture/layup to address this issue and other circumstances (such as compressive buckling loading) that might cause unwanted out-of-plane deformations. That is, an embodiment of the present invention considers the effects and provides solutions for local stretching non-uniformities or considers effects of in-plane compressive loads and operational loads on these thin, planar form factors. Furthermore, the material composition, geometries, density, position, and connectivity of the reinforcements across the surface area and through the thickness help improve the geometric moment of inertia by limiting the local strain mode and global deformation behavior (i.e. buckling).

In more detail, embodiments of the present invention provide methods and system for precisely controlling the 3D distribution and connectivity of structural reinforcement elements in a polymer-matrix composite. This is to achieve non-uniform, spatial, and directional stiffness tailoring in thin, planar form factor in reversibly deformable, segmented composites.

The basic rigid body motion (such as translating and rotating) reinforcements are modified to locally constrain their motion in specific ways. Here, embodiments of the present invention modify the geometric moment of inertia to and through thickness connections to increase the (out-of-plane) bending stiffness relative to the (in-plane) stretching stiffness without compromising the desirable deformability. Also, modifications of the areal reinforcement layout, material composition, size and orientation change the local axial stiffness.

Suitable methods and systems of modifying stretching or bending stiffness in thin, planar form factors according to embodiments of the present invention include: 1) placing tension cables (or stripes or wires) embedded in a deformable matrix; 2) maintaining, in a segmented composite, spatial separation of the reinforcements with respect to each other in plane; and/or 3) modifying areal reinforcement layout, size and orientation and geometry to change the local axial stiffness. Here, when processes 1), 2) and/or 3) are combined, an embodiment of the present invention can further locally tailor the ratio of local bending-to-axial stiffness in a spatially controllable fashion.

Placing Tension Cables (or Stripes or Wires) Embedded in a Deformable Matrix

Figure 5:
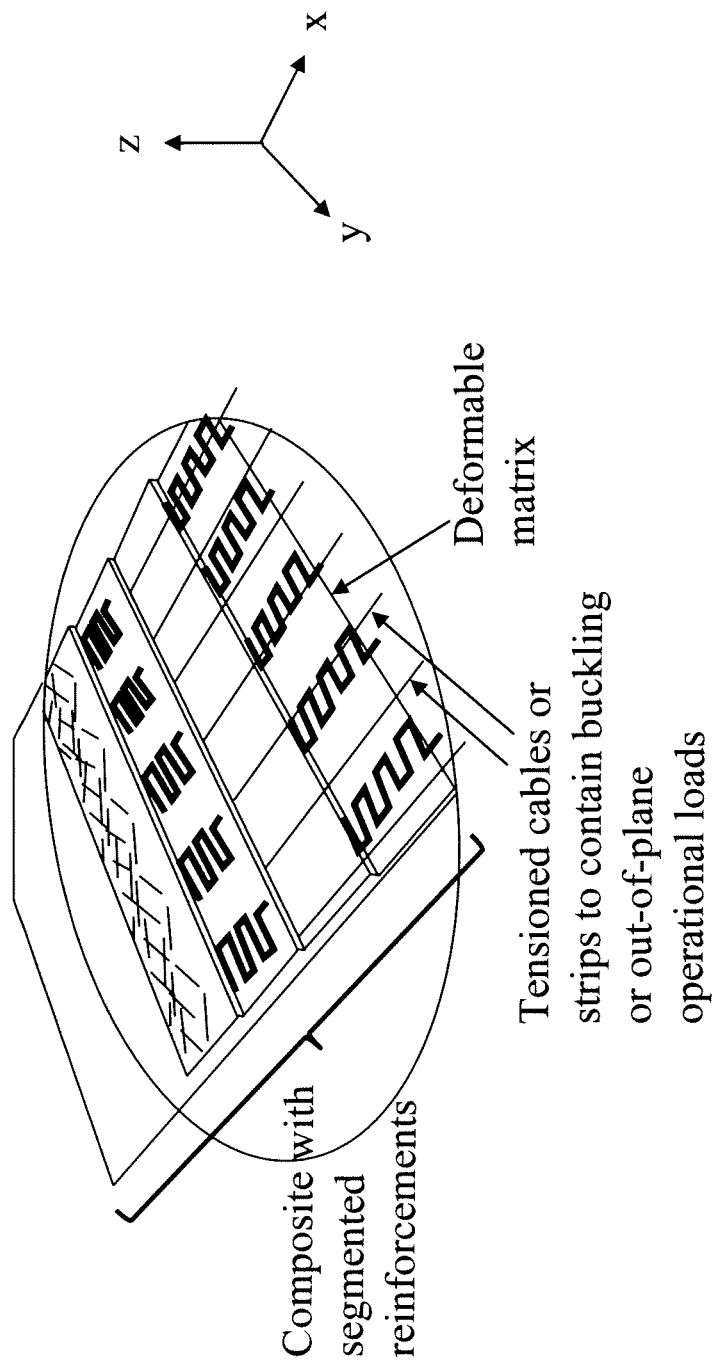
FIG. 5 illustrates tension cables (or strips or wires) in a deformable matrix to constrain out-of-plane deformation (e.g., deformation in the z axis) of the composite according to one embodiment of the present invention.

In more detail, FIG. 5 illustrates tension cables (or strips or wires) in a deformable matrix to constrain out-of-plane deformation (e.g., deformation in the z axis) of the composite according to one embodiment of the present invention. Here, the tension cables or strips are embedded in the deformable matrix on the top and bottom surfaces of the reinforced composite. The cables may be attached to structure boundaries in order to carry out of plane loads through the surface material to the structure. These cables or strips should not interfere with the desired in-plane deformation (e.g., in the y and x axes). In FIG. 5, much of the stiffness and strain compatibility issues can be handled by isolating the cables from the composite in sheaths that permit sliding of the cable but transfer normal loads through contact stresses.

FIGS. 6a and 6b illustrate tension wires (or strips or cables) in a deformable matrix to constrain out-of-plane deformation of the composite according to another embodiment of the present invention. In FIGS. 6a and 6b, the tension wires are shown to be integrated into the composite.

In more detail, FIG. 6a is a perspective view of the composite reinforcement, and FIG. 6b shows front and side views of the composite reinforcement. As shown in FIGS. 6a and 6b, the tension wires can counter a normal stress when the stress is perpendicular to the face of the material. That is, the wires prevents out-of-plane deformations (membrane deflections). In one embodiment of the present invention, the tension wires do not need to be pre-tensioned, but only fixed at the end points.

Figure 7:
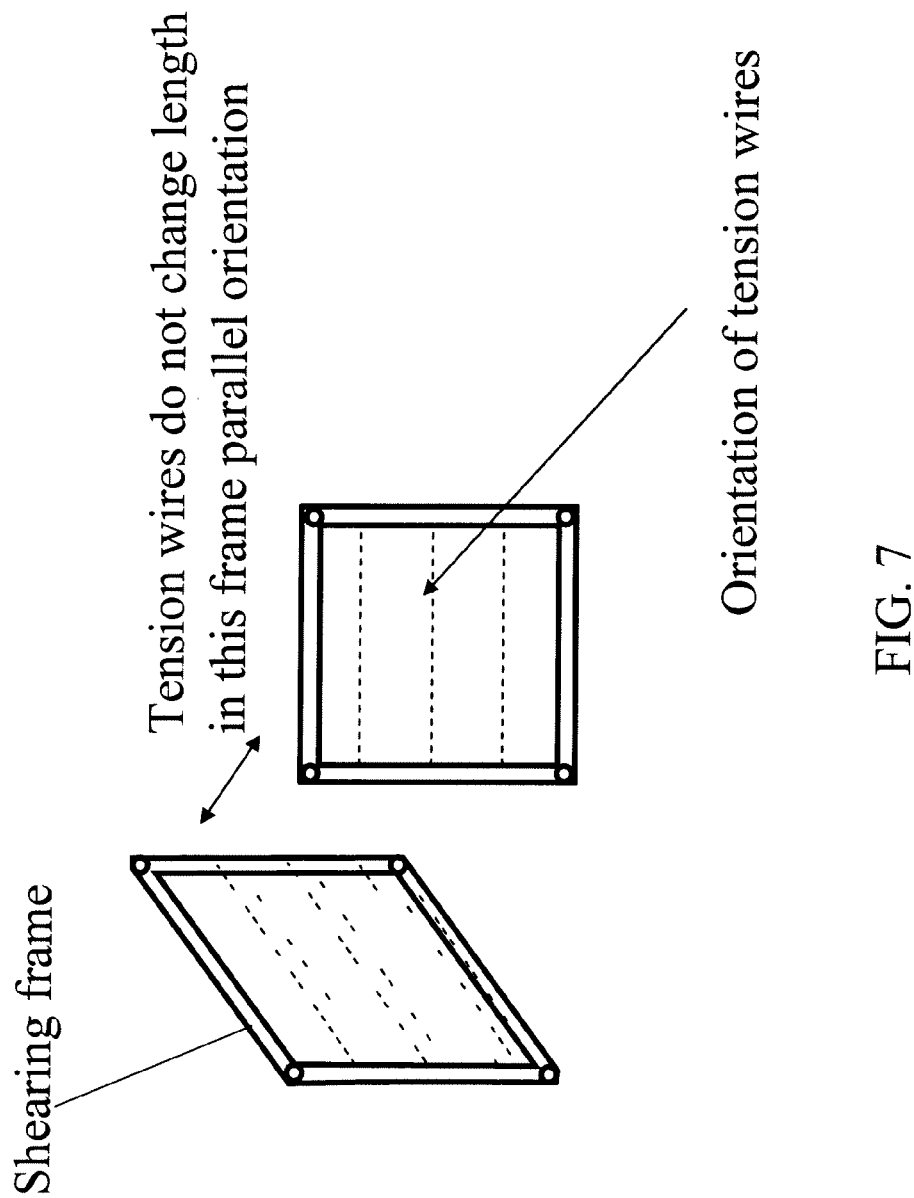
FIG. 7 illustrates a typical shearing frame that can utilize the embodiments of FIG. 5 and/or FIGS. 6a and 6b.

FIG. 7 illustrates a typical shearing frame that can utilize the embodiments of FIG. 5, and/or FIGS. 6a and 6b, and how the tension wires would be oriented in this frame during deformations. Here, wrinkling of the composite is prevented (or blocked) by the reinforcement rigidity interacting with the tension wires. In one embodiment, as discussed above, the tension wires do not need to be pre-tensioned, but only fixed at the end points. However, in another embodiment, the tension wires are pre-tensioned.

In more detail, an embodiment of the present invention provides a variable stiffness segmented composite material that includes a variable stiffness, a shearing frame, a reinforcement element, and a cable. The variable stiffness matrix has at least one edge. The shearing frame is along the at least one edge of the planar variable stiffness matrix. The reinforcement element is embedded within the variable stiffness matrix. In addition, the cable is also embedded within the variable stiffness matrix. Here, the cable runs along a plane of the variable stiffness matrix, and is attached to the shearing frame to mitigate out-of-plane deformation of the composite material by blocking a rigid body motion of the reinforcement element embedded within the variable stiffness matrix while allowing an in-plane deformation of the composite material. Maintaining (in a Segmented Composite) Spatial Separation of the Reinforcements with Respect to Each Other in Plane In a segmented composite, the reinforcements need to maintain their spatial separation with respect to each other in plane. According to an embodiment of the present invention, specialized reinforcement geometries or layouts within the composite effectively increase the bending stiffness or rigidity, thus preventing (or blocking) buckling and other undesirable deformations, even though these reinforcements maintain their spatial separation with respect to each other in plane.

Figures 8A, 8B, 8C:
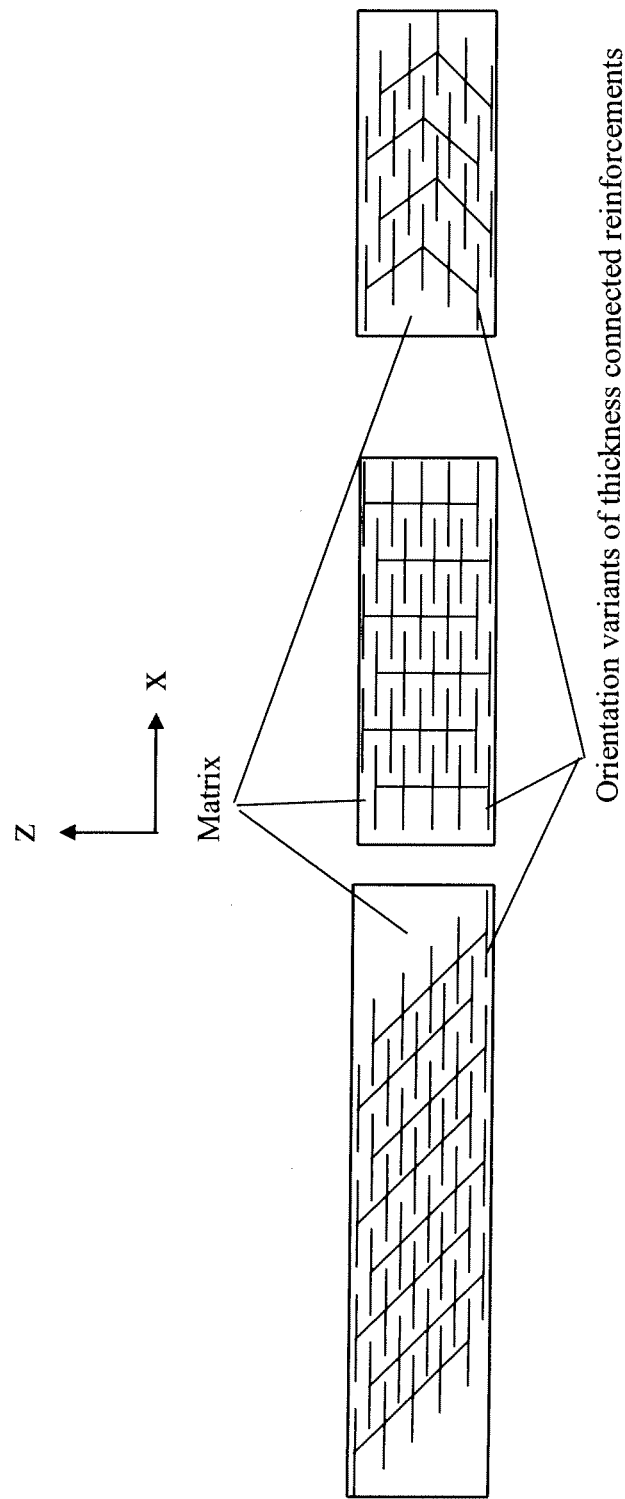
FIGS. 8a, 8b, and 8c show schematically how reinforcements through the thickness are attached and arranged with adjacent reinforcements across the area to permit stress transfer according to embodiments of the present invention.

FIGS. 8a, 8b, and 8c show schematically how reinforcements through the thickness are attached and interleaved (interdigitated) with adjacent reinforcements across the area to permit stress transfer according to embodiments of the present invention. Here, the important concept is that the reinforcements that are attached vertically cannot undergo rigid body motion (translate or rotate) with respect to one another. Only reinforcements adjacent horizontally are specifically permitted to undergo rigid body motion (translate or rotate). That is, the reinforcements here are designed to restrict out-of-plane (through thickness in z-direction) deformation resulting from non-uniform axial strain through the thickness of the component while still permitting in-plane deformation that requires uniform axial strain through the thickness of the component.

The embodiments of FIGS. 8a, 8b, and 8c build upon segmented reinforcement composites by connecting segmented reinforcements through the thickness of the composites. This essentially creates a (or one) reinforcement through the thickness of the composites in the z-direction, but in the x- and y-directions of the composites, adjacent reinforcements overlap in interleaved fashions to promote interlaminar stress transfer. Joining (or restraining) vertically adjacent reinforcements to restrain the overall composites from out-of-plane (or normal) displacements (represented several ways in FIGS. 13a, 13b, and 13c from the combination of 1 or 2 different fabrication processes as described below, e.g., in FIGS. 12, 14 and/or 15) and effectively increases the area moment of inertia and thus may dramatically increase the composite bending rigidity. Because laterally adjacent reinforcements have additional degrees of freedom for displacement, via a matrix-filled gap or compliant ligaments, the composite can support large in-plane strains. Thus, columns of joined planar reinforcements may displace laterally with respect to one another. These columns need not be straight and may contribute additional bending rigidity and other favorable attributes (such as stress transfer and impact energy dispersion) by having a non-straight connectivity. FIGS. 8a, 8b, and 8c respectively show straight, angled, and zigzag columns. Another possibility is a helical column.

As envisioned, the fabrication processes of the above described embodiments for maintaining spatial separation of the reinforcements with respect to one another in plane can include cutting, microstamping and/or embossing and/or photochemical etching to create 2D and 3D relief of segmented reinforcements. Joining is accomplished by brazing, welding, diffusion bonding and adhering selected regions of vertically stacked segmented reinforcement layers. The fabrication process can be modified to be amenable to either thermoplastic (such as in FIG. 10) or thermoset-based processing of the matrix.

Figure 9:
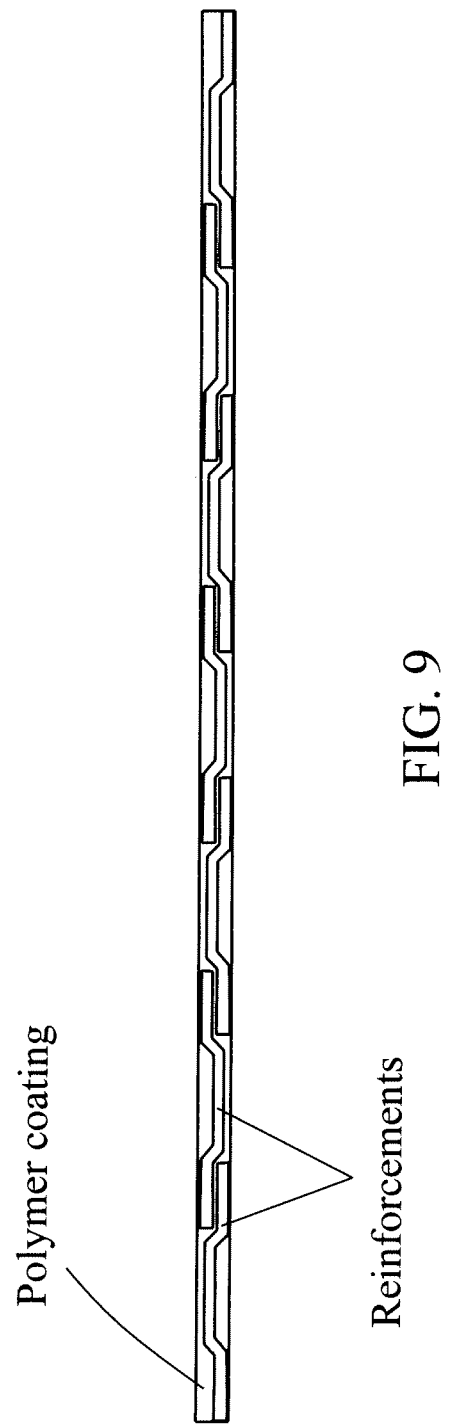
FIG. 9 shows an example of a laminar unit that is etched and stamped.
Figure 12:
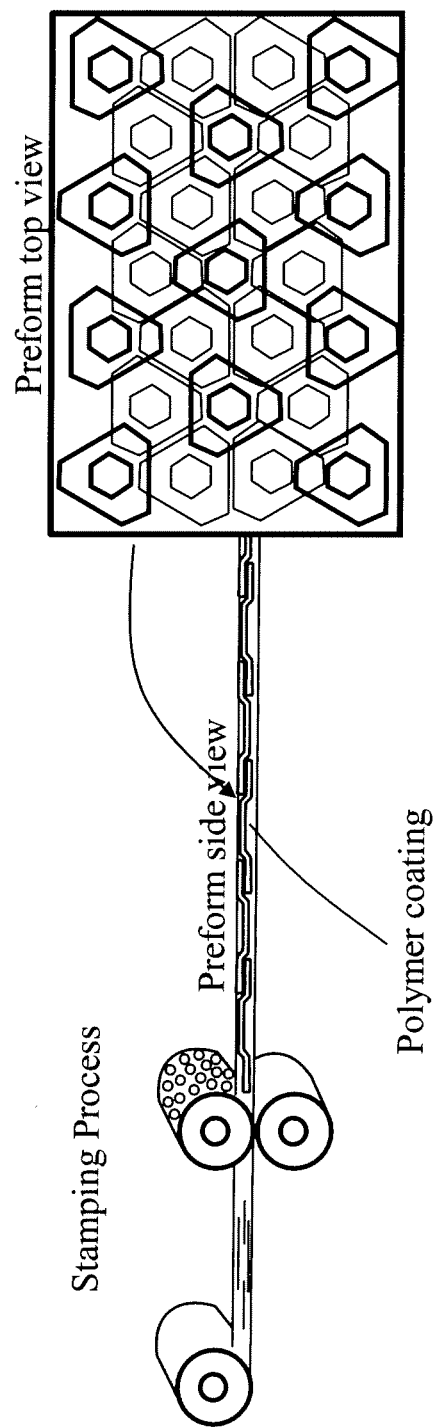
FIG. 12 illustrates a stamping process for producing 3D relief and registration holes and dimples in spatially controlled reinforcement preforms.
Figure 14:
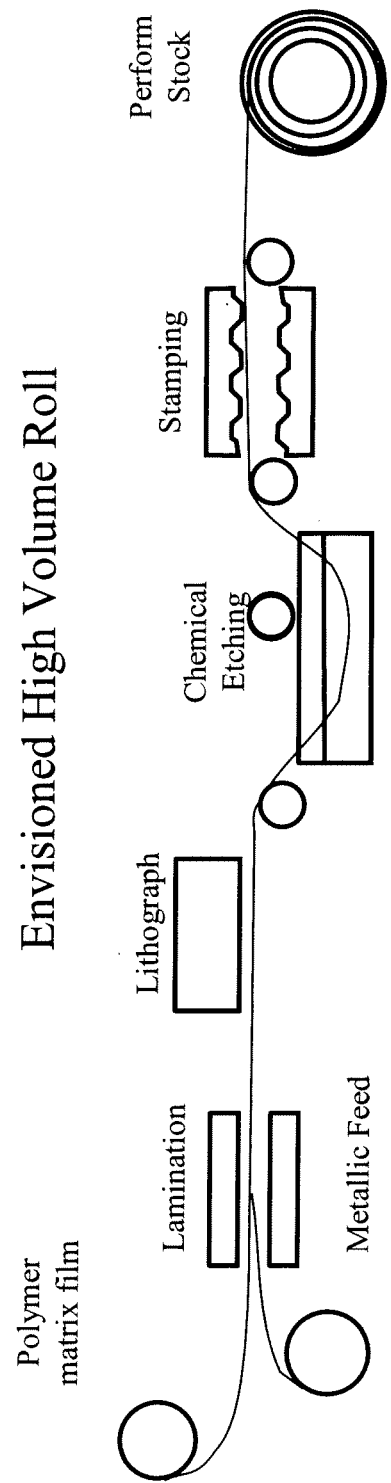
FIG. 14 illustrates a high volume roll process according to an embodiment of the present invention.
Figure 15:
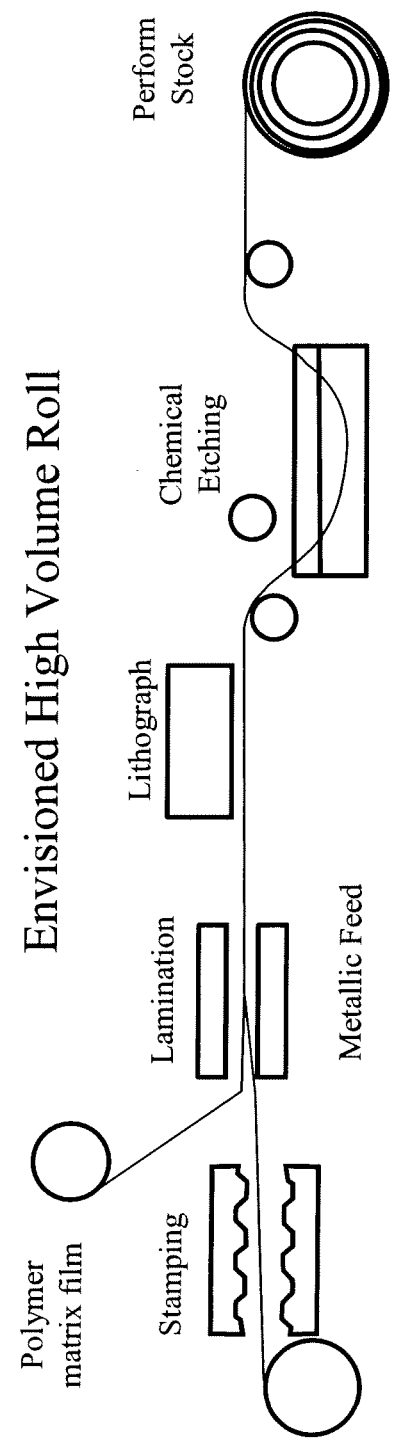
FIG. 15 illustrates a high volume roll process according to another embodiment of the present invention.

In more detail, specialized reinforcement geometries may be cutting, micro-stamped or etched into a laminar unit (for thermoplastic matrix composites) or a preform unit (with a backing structure for a thermoset matrix composite) such as schematically shown in FIG. 12 to produce 3D relief in the individual tile reinforcements. FIG. 9 shows an example of a laminar unit that is cut, etched and stamped. That is, FIG. 9 shows a laminar or preform unit for thermoplastic or thermoset processing. FIGS. 14 and 15 show several suitable potential processes to form such laminar or preform units.

Referring to FIG. 14, a high volume manufacturing method using a roll fabrication process is shown. Here the end product is a spool of etched material with specific architecture applied to a flexible backing structure. In one embodiment, the process goes as follows. The backing material is laminated to the base structural material which then undergoes a patterning operation. After patterning, an etchant is used to remove unwanted base material, and achieve the desired architecture. This roll of material can then be used similarly to fabric material in fiber composites to make a layup of reinforcement into which resin can be introduced and hardened. Several composite fabrication methods are compatible with this process. These include wet layup where resin is applied to each layer as it is added to the stack, resin infusion methods such as Resin Transfer Molding and Vacuum Assisted Resin Transfer Molding, and spray methods similar to those used in fabricating chopped fiber composites.

Another extension of the technique is to produce "prepreg" type material with specific geometric control of reinforcement or other functional elements. This is useful for other composite processing techniques which use partially cured matrix materials to assist in the layup and consolidation of the composite. The materials can be then cured in molds generally with additional pressure and heat used to achieve consolidation and full cure. This can be achieved by extending the mesh backing process an additional step after the mesh is created. Here a partially cured matrix material such as a thermosetting epoxy is applied to the mesh structure so that it adheres to the mesh and partially fills the voids of the mesh. At the working temperature, this material is generally a solid gel like consistency, and then at elevated cure temperatures becomes fluid and fills in all voids. Further time at high temperature provides complete cure of the polymer. After the matrix is softened, the mesh provides control over the through thickness spacing of the structural elements.

Referring to FIG. 15, yet another method for producing 2D and 3D relief of segmented reinforcements involves die-cutting and/or stamping of the raw reinforcement material. In this process, a long sheet of metal is passed between two dye rollers, as depicted in FIG. 15, or plates which have the negative of the desired pattern. After the pattern is stamped/die-cut on the metal, a reel of supported platelets is produced. This makes the preform for the reinforced shape memory polymer (SMP) composite material. 2-D spatial control of the reinforcement platelets is achieved by the precise manufacturing of the die cutter.

Similar result as the above mentioned stamp/die cutting method can be achieved by use of other machining methods to produce the preform. For example, cutting, laser machining, water jet machining, rapid prototyping, and conventional milling machining can produce the preform.

Figure 13:
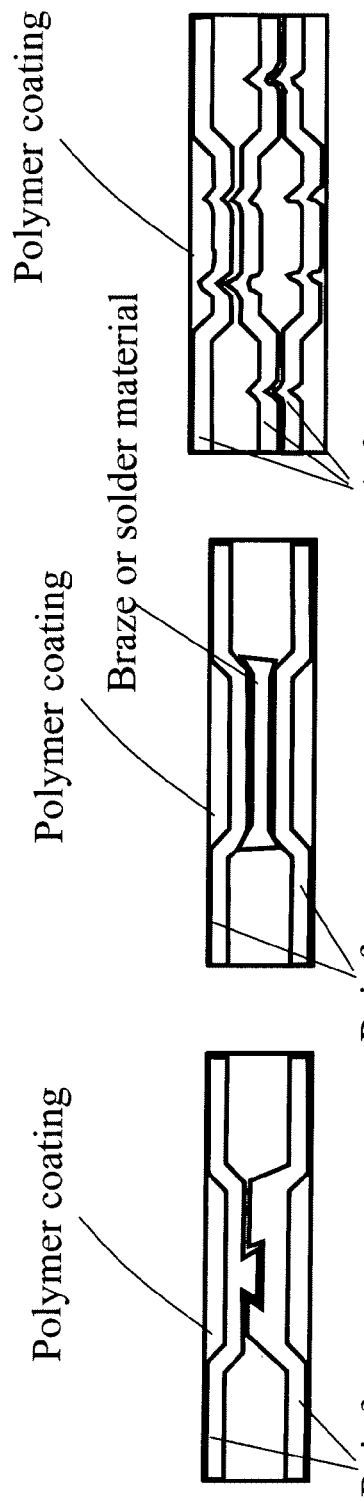
FIG. 13a illustrates a reinforcement interlayer attachment method utilizing a mechanical interlock to restrict motion of vertically aligned reinforcements to improve mechanical load transmission and increase the moment of inertial and therefore stiffness.
FIG. 13b illustrates a reinforcement interlayer attachment method utilizing brazing or welding to restrict motion of vertically aligned reinforcements to improve mechanical load transmission and increase the moment of inertial and therefore bending stiffness.
FIG. 13c illustrates a reinforcement interlayer attachment method utilizing stamped dimples or troughs to restrict motion of vertically aligned reinforcements to improve mechanical load transmission and increase the moment of inertial and therefore bending stiffness.

In addition, to rigidly attach vertically aligned reinforcements, stitching wires, interference fits (with stamped dimples for example), brazing, welding, mechanical interlocking (such as tongue and groove), may be used as shown in FIGS. 13a, 13b, and 13c. The vertically overlapping nature of the reinforcements helps make the shear strain more uniform through the thickness, thus minimizing (or reducing) bending.

Figure 10:
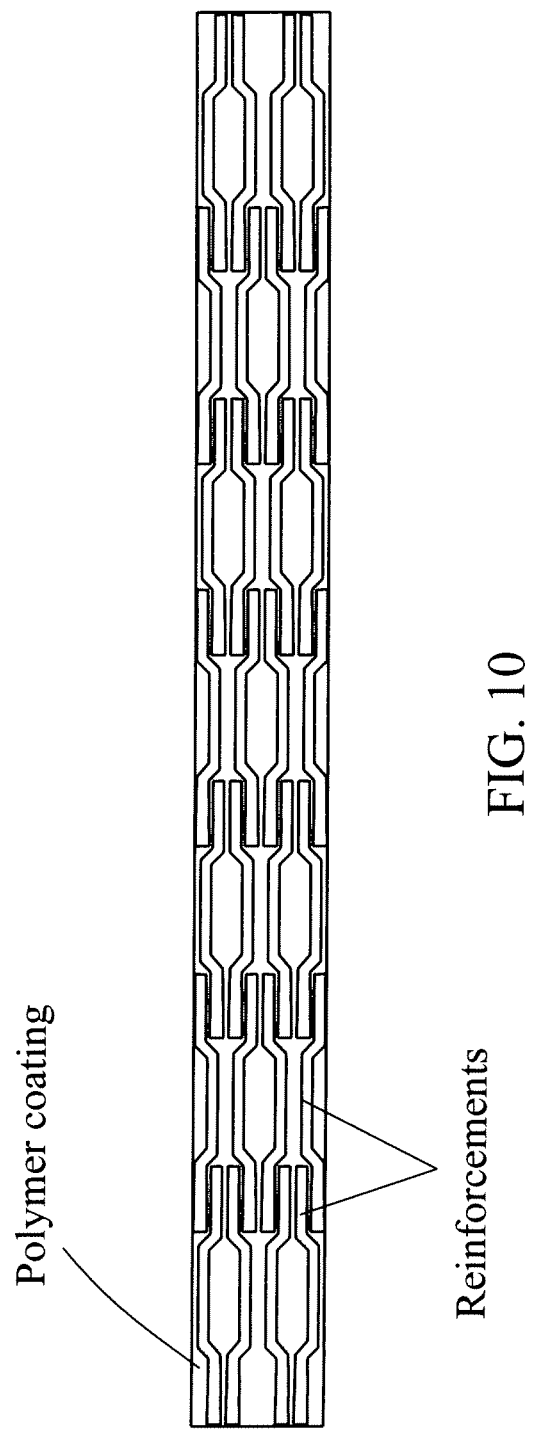
FIG. 10 illustrates a composite made with microstamped and etched laminar units made in a process according to an embodiment of the present invention.
Figure 11:
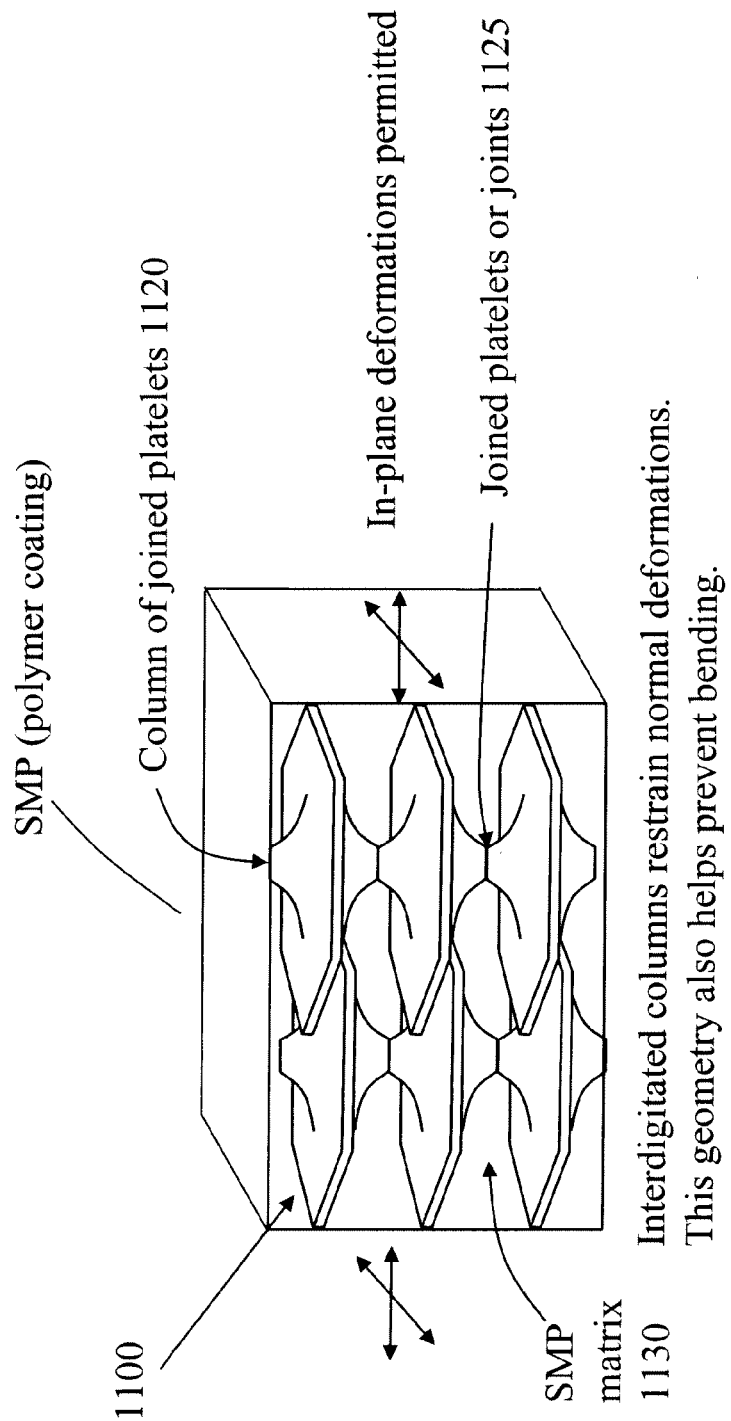
FIG. 11 shows a perspective view of reinforcements according to an embodiment of the present invention.

Again, the important concept of FIGS. 8a, 8b, and 8c is that reinforcements that are attached vertically cannot translate or rotate with respect to one another, and reinforcements adjacent to each other can undergo rigid body motion by translating or rotating. FIG. 9 shows laminar or preform unit for thermoplastic or thermoset processing. FIG. 10 shows composite made with microstamped and etched laminar units made in a process, e.g., shown in FIG. 12, which shows a stamping process for producing 3D relief and registration holes and dimples in spatially controlled reinforcement preforms. FIG. 11 shows a perspective view of reinforcements according to an embodiment of the present invention.

In more detail, FIG. 11 illustrates reinforcements that have interleaved columns to restrain normal deformations. That is, as shown in FIG. 11, a shape memory polymer (SMP) matrix 1130 is combined with the reinforcements 1100 with columns of joined plates 1120 joined by respective joints (or connectors) 1125 to permit in-plane deformations while restraining normal deformations. Here, the geometry of the reinforcements 1100 also helps prevent (or reduce) bending of the component composed of the reinforcements 1100 and the SMP matrix 1130.

More specifically, an embodiment of the present invention provides a variable stiffness segmented composite material including a variable stiffness matrix (e.g., SMP 1130) and a plurality of rigidly interconnected reinforcements (e.g., reinforcements 1100) embedded within the variable stiffness matrix. The interconnected reinforcements are for mitigating a deformation of the composite material along a first direction by blocking a rigid body motion of the reinforcements with respect to one another in the first direction while allowing a deformation in a second direction differing from the first direction.

In one embodiment, the interconnected reinforcements are configured to move with respect to one another to allow for an in-plane deformation of the composite material while mitigating an out-of-plane deformation of the composite material.

Another embodiment of the present invention provides a variable stiffness segmented composite material including a variable stiffness matrix, a plurality of reinforcement elements (e.g., plates 1120) embedded within the variable stiffness matrix, and a plurality of connectors (e.g., joints 1125). The reinforcements are rigidly interconnected by the connectors to mitigate a deformation of the composite material along a first direction while allowing deformation of the variable stiffness matrix along a second direction differing from the first direction.

The attachment process of the reinforcements (e.g., reinforcements 1100) varies depending on the method of composite fabrication. For laminar thermoplastic composites that can be heat-pressed together, the use of stitching and interference fitting can be used, for example in FIGS. 13a, 13b, and 13c. For thermoset composites, preforms can be attached before resin infusion. These attachment methods can be broadened to include brazing and spot welding, for example. Modification of the Areal Reinforcement Layout, Size and Orientation and Geometry Changes the Local Axial Stiffness.

As discussed above, a modification of areal reinforcement layout, size and orientation and geometry can change the local axial stiffness, thereby achieving proper variable stiffness composite properties over a component area. FIGS. 4a and 4b illustrate a process flow according to one embodiment of the present invention to achieve the proper variable stiffness composite properties. Here, the first step in the creation of the proper composite is the identification of the deformation necessary to achieve the desired motion of the component. Given the spatial mapping of needed deformations as shown in FIG. 4a, a mapping of deformation to stiffness properties, such as that generated via simulations or experimental testing, can be used to identify particular reinforcement microstructures that will provide the proper combinations of properties for that region. Many variables can be altered to provide changes in the stiffness and strain properties of the composites as shown in FIG. 4b. Other considerations may also provide input to the selection of particular designs including reinforcement material composition(s), surface texture requirements, and electrical, magnetic, or thermal properties, etc. Given this information, a reinforcement layout may be defined that contains variations of geometry across the surface that spatially optimizes these desired qualities. Methods such as cutting, chemical etching or stamping may be used to physically define the reinforcement pattern. Several reinforcement layers may be combined with a hosting matrix material, such as a shape memory polymer or other phase change material, to create a composite material component.

In view of the foregoing, embodiments of the present invention provide systems and methods for precisely controlling the 3D distribution and connectivity of structural reinforcement elements in a polymer-matrix composite. In one embodiment, the controlling of the 3D distribution and connectivity of structural reinforcement elements in the polymer-matrix composite is to achieve nonuniform, spatial, and directional stiffness tailoring in thin, planar form factor in reversibly deformable, segmented composites.

Other embodiments of the present invention provide systems and methods to improve the spatial variability and tailorability of in-plane and out-of-plane stiffness while still maintaining highly controlled geometric layouts for segmented composite materials. Because the reinforcements are designed to move (such as translation and rotation) with respect to one another, these composites are highly deformable.

Other embodiments of the present invention also provide systems and methods that utilize cutting, stamping or etching to create 3D relief in the reinforcements and attaching these reinforcements through the thickness in thin form factor structures. This changes the effective mechanical load transfer and moment of inertia through the thickness of the composite.

Other embodiments of the present invention also provide systems and methods that utilize registration dimples or troughs for thermoplastic-based composites to precisely align and restrict relative motion of these reinforcements, which mechanically "attaches" these reinforcements via load transmission vertically through the thickness.

Other embodiments of the present invention also provide systems and methods that utilize brazing, welding, interference fit, or mechanical interlocks (such as tongue and groove) to precisely align and restrict relative motion of reinforcement preforms in thermoset based composites.

Other embodiments of the present invention also provide systems and methods that vary gap distance, reinforcement material composition, size, orientation and geometry over the surface area to control in-plane stiffness locally.

In addition, one or more of the above described methods and systems according to embodiments of the present invention can be applied to morphing and variable stiffness materials, multifunctional structural composite materials generically, integrated electronics, sensors, and/or thermal control elements. Moreover, other methods and systems according to embodiments of the present invention are applied to structural materials rather than materials generically.

While certain exemplary embodiments have been described in detail and shown in the accompanying drawings, it is to be understood that such embodiments are merely illustrative of and not restrictive of the broad invention. It will thus be recognized by a person skilled in the art that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. A composite material comprising:
   a polymer-based or silicone-based continuous variable stiffness matrix;
   a first plurality of rigidly interconnected reinforcements embedded within the continuous variable stiffness matrix; and
   a second plurality of rigidly interconnected reinforcements embedded within the continuous variable stiffness matrix, the second plurality of rigidly interconnected reinforcements being separated from the first plurality of rigidly interconnected reinforcements by the continuous variable stiffness matrix,
   the first plurality and the second plurality of rigidly interconnected reinforcements opposing a deformation of the composite material along a first direction by blocking a rigid body motion of the reinforcements with respect to one another in the first direction while allowing a deformation in a second direction differing from the first direction,
   wherein the first plurality of rigidly interconnected reinforcements are rigidly connected to one another in the first direction,
   wherein the second plurality of rigidly interconnected reinforcements are rigidly connected to one another in the first direction, and
   wherein the first plurality of rigidly interconnected reinforcements is spaced from the second plurality of rigidly interconnected reinforcements in the first direction, the second direction, and a third direction perpendicular to the first and second directions.

2. The composite material of claim 1, wherein the first plurality of rigidly interconnected reinforcements and the second plurality of rigidly interconnected reinforcements are configured to move with respect to one another to allow for an in-plane deformation of the composite material while mitigating an out-of-plane deformation of the composite material.

3. The composite material of claim 1, wherein the first direction is perpendicular to the second direction.

4. The composite material of claim 1, wherein the first plurality of rigidly interconnected reinforcements and the second plurality of rigidly interconnected reinforcements are composed of one or more constant stiffness materials.

5. The composite material of claim 1, wherein the first plurality of rigidly interconnected reinforcements and the second plurality of rigidly interconnected reinforcements are composed of metal.

6. The composite material of claim 1, wherein the continuous variable stiffness matrix is composed of a thermoplastic-, thermoset-, or silicone-based material.

7. The composite material of claim 6, wherein the first plurality of rigidly interconnected reinforcements and the second plurality of rigidly interconnected reinforcements comprise registration dimples or troughs to precisely align and restrict relative motion of the first plurality of rigidly interconnected reinforcements and the second plurality of rigidly interconnected reinforcements embedded in the continuous variable stiffness matrix.

8. The composite material of claim 7, wherein the registration dimples or troughs mechanically interconnects the first plurality of rigidly interconnected reinforcements and the second plurality of rigidly interconnected reinforcements via load transmission along the first direction.

9. The composite material of claim 5, wherein the first plurality of rigidly interconnected reinforcements and the second plurality of rigidly interconnected reinforcements are brazed, welded, interference fitted, or mechanically interlocked to one another to precisely align and restrict relative motion of the first plurality of rigidly interconnected reinforcements and the second plurality of rigidly interconnected reinforcements embedded in the continuous variable stiffness matrix.

10. The composite material of claim 9, wherein the first plurality of rigidly interconnected reinforcements and the second plurality of rigidly interconnected reinforcements comprise tongues and grooves to mechanically interlock the first plurality of rigidly interconnected reinforcements and the second plurality of rigidly interconnected reinforcements to one another and to precisely align and restrict relative motion of the first plurality of rigidly interconnected reinforcements and the second plurality of rigidly interconnected reinforcements embedded in the continuous variable stiffness matrix.

11. The composite material of claim 1,
wherein each of the first plurality of rigidly interconnected reinforcements and each of the second plurality of rigidly interconnected reinforcements has a three-dimensional cut, stamped or etched relief, and
wherein the first plurality of rigidly interconnected reinforcements and the second plurality of rigidly interconnected reinforcements are attached along the first direction to change an effective mechanical load transfer and moment of inertial through a thickness of the composite material.

12. A composite material comprising:
a polymer-based or silicone-based continuous variable stiffness matrix;
a first plurality of rigidly interconnected reinforcements embedded within the continuous variable stiffness matrix;
a second plurality of rigidly interconnected reinforcements embedded within the continuous variable stiffness matrix, the second plurality of rigidly interconnected reinforcements being separated from the first plurality of rigidly interconnected reinforcements by the continuous variable stiffness matrix; and
a plurality of connectors,
the first plurality of rigidly interconnected reinforcements being rigidly interconnected by the connectors in a first direction and the second plurality of rigidly interconnected reinforcements being rigidly interconnected by the connectors in the first direction to oppose a deformation of the composite material along the first direction while allowing deformation of the continuous variable stiffness matrix along a second direction differing from the first direction, the connectors for interconnecting the first plurality of rigidly interconnected reinforcements being different from the connectors for interconnecting the second plurality of rigidly interconnected reinforcements,
wherein the first plurality of rigidly interconnected reinforcements is spaced from the second plurality of rigidly interconnected reinforcements in the first direction, the second direction, and a third direction perpendicular to the first and second directions.

13. The composite material of claim 12, wherein the first plurality of rigidly interconnected reinforcements and the second plurality of rigidly interconnected reinforcements are interconnected by the connectors to move with respect to one another to allow for an in-plane deformation of the composite material while mitigating an out-of-plane deformation of the composite material.

14. The composite material of claim 12, wherein the first direction is perpendicular to the second direction.

15. The composite material of claim 12, wherein the continuous variable stiffness matrix is composed of a thermoplastic-, thermoset-, or silicone-based material.

16. The composite material of claim 15, wherein the connectors comprise registration dimples or troughs to precisely align and restrict relative motion of the reinforcements embedded in the continuous variable stiffness matrix.

17. The composite material of claim 16, wherein the registration dimples or troughs mechanically interconnects the first plurality of rigidly interconnected reinforcements and the second plurality of rigidly interconnected reinforcements via load transmission along the first direction.

18. The composite material of claim 17, wherein the connectors comprise braze joints, weld joints, interference fittings, or mechanical interlocks to interconnect the first plurality of rigidly interconnected reinforcements and the second plurality of rigidly interconnected reinforcements to one another and to precisely align and restrict relative motion of the first plurality of rigidly interconnected reinforcements and the second plurality of rigidly interconnected reinforcements embedded in the continuous variable stiffness matrix.

19. The composite material of claim 18, wherein the first plurality of rigidly interconnected reinforcements and the second plurality of rigidly interconnected reinforcements have geometric shape, spacing and interconnectivity configured from a terrain map of component deformation.

20. The composite material of claim 18, wherein the connectors comprise tongues and grooves to mechanically interlock the first plurality of rigidly interconnected reinforcements and the second plurality of rigidly interconnected reinforcements to one another and to precisely align and restrict relative motion of the first plurality of rigidly interconnected reinforcements and the second plurality of rigidly interconnected reinforcements embedded in the continuous variable stiffness matrix.

21. A composite material comprising:
a continuous planar variable stiffness matrix having at least one edge;
a shearing frame along the at least one edge of the continuous planar variable stiffness matrix;
a first reinforcement element embedded within the continuous planar variable stiffness matrix;
a second reinforcement element embedded within the continuous planar variable stiffness matrix, the second reinforcement element being spaced apart from the first reinforcement element in a first direction by the continuous planar variable stiffness matrix; and
a cable embedded within the continuous planar variable stiffness matrix,
the cable extending in a second direction along a plane of the continuous planar variable stiffness matrix, and
the cable being attached to the shearing frame to mitigate out-of-plane deformation of the composite material by blocking a rigid body motion of the first and second reinforcement elements embedded within the continuous planar variable stiffness matrix while allowing an in-plane deformation of the composite material,
wherein the first direction is perpendicular to the plane of the continuous planar variable stiffness matrix, and
wherein the first reinforcement element is spaced from the second reinforcement element in the first direction, the second direction, and a third direction perpendicular to the first and second directions.

* * * * *